(12) United States Patent
Brandenburg et al.

(10) Patent No.: US 11,973,268 B2
(45) Date of Patent: Apr. 30, 2024

(54) MULTI-LAYERED AIR WAVEGUIDE ANTENNA WITH LAYER-TO-LAYER CONNECTIONS

(71) Applicant: Aptiv Technologies AG, Schaffhausen (CH)

(72) Inventors: Scott D. Brandenburg, Kokomo, IN (US); David Wayne Zimmerman, Noblesville, IN (US); Mark William Hudson, Russiaville, IN (US)

(73) Assignee: Aptiv Technologies AG, Schaffhausen (CH)

( * ) Notice: Subject to any disclaimer, the term of this patent is extended or adjusted under 35 U.S.C. 154(b) by 432 days.

(21) Appl. No.: 17/323,877

(22) Filed: May 18, 2021

(65) Prior Publication Data
US 2022/0352640 A1 Nov. 3, 2022

Related U.S. Application Data

(60) Provisional application No. 63/183,595, filed on May 3, 2021.

(51) Int. Cl.
*H01Q 13/18* (2006.01)
*G01S 7/03* (2006.01)
(Continued)

(52) U.S. Cl.
CPC ............ *H01Q 13/18* (2013.01); *G01S 7/032* (2013.01); *G01S 13/931* (2013.01);
(Continued)

(58) Field of Classification Search
None
See application file for complete search history.

(56) References Cited

U.S. PATENT DOCUMENTS

| | | | |
|---|---|---|---|
| 3,462,713 | A | 8/1969 | Knerr |
| 3,579,149 | A | 5/1971 | Ramsey |

(Continued)

FOREIGN PATENT DOCUMENTS

| | | |
|---|---|---|
| CA | 2654470 | 12/2007 |
| CN | 1620738 | 5/2005 |

(Continued)

OTHER PUBLICATIONS

Vincenti Gatti, Roberto & Luca, Marcaccioli & Sbarra, Elisa & Sorrentino, Roberto. (2009). Flat Array Antennas for Ku-Band Mobile Satellite Terminals. International Journal of Antennas and Propagation. 2009. 10.1155/2009/836074. (Year: 2009).*

(Continued)

*Primary Examiner* — Bernarr E Gregory
(74) *Attorney, Agent, or Firm* — Harness, Dickey & Pierce, P.L.C.

(57) ABSTRACT

This document describes techniques, apparatuses, and systems for a multi-layer air waveguide with layer-to-layer connections. Each pre-formed layer of the air waveguide is attached to at least one other pre-formed layer by a mechanical interface. The mechanical interface may be a stud-based interface, a snap fastener-based interface, a ball-and-socket based interface, or a pressure contact interface utilizing irregular roughed surfaces of each pre-formed layer. The mechanical interfaces of the pre-formed layers structurally hold the air waveguide together and electrically couple all of the pre-formed layers. In this manner, the cost of manufacturing the air waveguide antennas may be less expensive than previous manufacturing processes.

20 Claims, 12 Drawing Sheets

(51) Int. Cl.
  *G01S 13/931* (2020.01)
  *H01Q 1/32* (2006.01)
  *H01Q 1/38* (2006.01)
  *H01Q 1/42* (2006.01)
  *G01S 13/00* (2006.01)

(52) U.S. Cl.
  CPC ............. *H01Q 1/3233* (2013.01); *H01Q 1/38* (2013.01); *H01Q 1/42* (2013.01)

(56) References Cited

U.S. PATENT DOCUMENTS

| | | | |
|---|---|---|---|
| 4,157,516 A | | 6/1979 | Van De Grijp |
| 4,353,072 A | * | 10/1982 | Monser ............. H01Q 13/0275 |
| | | | 343/778 |
| 4,353,074 A | * | 10/1982 | Monser ............. H01Q 13/0275 |
| | | | 343/786 |
| 4,453,142 A | | 6/1984 | Murphy |
| 4,562,416 A | | 12/1985 | Sedivec |
| 5,049,894 A | * | 9/1991 | Homer ................. H01Q 1/087 |
| | | | 343/878 |
| 5,982,256 A | | 11/1999 | Uchimura et al. |
| 5,986,527 A | | 11/1999 | Ishikawa et al. |
| 6,489,855 B1 | | 12/2002 | Kitamori et al. |
| 6,492,949 B1 | * | 12/2002 | Breglia ................. H01Q 13/18 |
| | | | 343/846 |
| 6,794,950 B2 | | 9/2004 | Du Tolt et al. |
| 6,867,660 B2 | | 3/2005 | Kitamori et al. |
| 6,958,662 B1 | | 10/2005 | Salmela et al. |
| 7,973,616 B2 | | 7/2011 | Shijo et al. |
| 7,994,879 B2 | | 8/2011 | Kim et al. |
| 8,013,694 B2 | | 9/2011 | Hiramatsu et al. |
| 8,089,327 B2 | | 1/2012 | Margomenos et al. |
| 8,098,207 B1 | * | 1/2012 | Herting ................ H01Q 21/005 |
| | | | 343/774 |
| 8,159,316 B2 | | 4/2012 | Miyazato et al. |
| 8,692,731 B2 | | 4/2014 | Lee et al. |
| 9,007,269 B2 | | 4/2015 | Lee et al. |
| 9,450,281 B2 | | 9/2016 | Kim |
| 9,673,532 B2 | | 6/2017 | Cheng et al. |
| 9,935,065 B1 | | 4/2018 | Baheti et al. |
| 10,468,736 B2 | * | 11/2019 | Mangaiahgari ........... G01S 7/02 |
| 10,775,573 B1 | | 9/2020 | Hsu et al. |
| 10,833,385 B2 | | 11/2020 | Mangaiahgari et al. |
| 2002/0021197 A1 | | 2/2002 | Elco |
| 2004/0069984 A1 | | 4/2004 | Estes et al. |
| 2006/0113598 A1 | | 6/2006 | Chen et al. |
| 2008/0129409 A1 | | 6/2008 | Nagaishi et al. |
| 2008/0150821 A1 | | 6/2008 | Koch et al. |
| 2009/0207090 A1 | | 8/2009 | Pettus et al. |
| 2009/0243762 A1 | | 10/2009 | Chen et al. |
| 2012/0013421 A1 | | 1/2012 | Hayata |
| 2012/0050125 A1 | | 3/2012 | Leiba et al. |
| 2012/0068316 A1 | | 3/2012 | Ligander |
| 2012/0163811 A1 | | 6/2012 | Doany et al. |
| 2012/0242421 A1 | | 9/2012 | Robin et al. |
| 2012/0256796 A1 | | 10/2012 | Leiba |
| 2013/0057358 A1 | | 3/2013 | Anthony et al. |
| 2014/0015709 A1 | | 1/2014 | Shijo et al. |
| 2014/0091884 A1 | | 4/2014 | Flatters |
| 2014/0106684 A1 | | 4/2014 | Burns et al. |
| 2014/0168024 A1 | * | 6/2014 | Lee ........................ H01Q 13/06 |
| | | | 343/767 |
| 2015/0097633 A1 | | 4/2015 | Devries et al. |
| 2015/0229017 A1 | | 8/2015 | Suzuki et al. |
| 2015/0229027 A1 | | 8/2015 | Sonozaki et al. |
| 2015/0357698 A1 | | 12/2015 | Kushta |
| 2015/0364804 A1 | | 12/2015 | Tong et al. |
| 2015/0364830 A1 | | 12/2015 | Tong et al. |
| 2016/0043455 A1 | | 2/2016 | Seler et al. |
| 2016/0049714 A1 | | 2/2016 | Ligander et al. |
| 2016/0087325 A1 | * | 3/2016 | Alias .................... H05K 3/1233 |
| | | | 333/238 |
| 2016/0118705 A1 | | 4/2016 | Tang et al. |
| 2016/0204495 A1 | | 7/2016 | Takeda et al. |
| 2016/0276727 A1 | | 9/2016 | Dang et al. |
| 2016/0293557 A1 | | 10/2016 | Topak et al. |
| 2016/0301125 A1 | | 10/2016 | Kim et al. |
| 2016/0336654 A1 | * | 11/2016 | Aoki ......................... H01Q 5/55 |
| 2017/0084554 A1 | | 3/2017 | Dogiamis et al. |
| 2017/0324135 A1 | | 11/2017 | Blech et al. |
| 2018/0131084 A1 | | 5/2018 | Park et al. |
| 2018/0226709 A1 | | 8/2018 | Mangaiahgari |
| 2018/0233465 A1 | | 8/2018 | Spella et al. |
| 2018/0284186 A1 | | 10/2018 | Chadha et al. |
| 2018/0343711 A1 | | 11/2018 | Wixforth et al. |
| 2018/0351261 A1 | | 12/2018 | Kamo et al. |
| 2019/0006743 A1 | | 1/2019 | Kirino et al. |
| 2019/0013563 A1 | | 1/2019 | Takeda et al. |
| 2019/0058260 A1 | * | 2/2019 | Kirino .................. H01Q 21/005 |
| 2019/0269007 A1 | * | 8/2019 | Sikina .................. H05K 1/0224 |
| 2019/0372237 A1 | * | 12/2019 | Yman ....................... H01Q 1/50 |
| 2020/0021001 A1 | | 1/2020 | Mangaiahgairi |
| 2020/0235453 A1 | | 7/2020 | Lang |
| 2020/0343612 A1 | | 10/2020 | Shi |
| 2021/0036393 A1 | | 2/2021 | Mangaiahgari |

FOREIGN PATENT DOCUMENTS

| | | |
|---|---|---|
| CN | 2796131 | 7/2006 |
| CN | 201383535 | 1/2010 |
| CN | 103515682 | 1/2014 |
| CN | 104900956 | 9/2015 |
| CN | 105609909 | 5/2016 |
| CN | 105680133 | 6/2016 |
| CN | 105958167 | 9/2016 |
| CN | 209389219 | 9/2019 |
| DE | 102019200893 | 7/2020 |
| EP | 2500978 | 9/2012 |
| EP | 2843758 | 3/2015 |
| EP | 3352302 A1 | 7/2018 |
| EP | 3460903 | 3/2019 |
| GB | 2489950 | 10/2012 |
| JP | 2003289201 | 10/2003 |
| KR | 100846872 | 5/2008 |
| WO | 2013189513 | 12/2013 |
| WO | 2018003932 | 1/2018 |
| WO | 2019065042 A1 | 4/2019 |

OTHER PUBLICATIONS

"Extended European Search Report", EP Application No. 18153137.7, dated Jun. 15, 2018, 8 pages.

"Extended European Search Report", EP Application No. 20166797, dated Sep. 16, 2020, 11 pages.

"Foreign Office Action", CN Application No. 201810122408.4, dated Jun. 2, 2021, 15 pages.

"Non-Final Office Action", U.S. Appl. No. 16/583,867, dated Feb. 18, 2020, 8 pages.

"Non-Final Office Action", U.S. Appl. No. 15/427,769, dated Nov. 13, 2018, 8 pages.

"Notice of Allowance", U.S. Appl. No. 15/427,769, dated Jun. 28, 2019, 9 pages.

"Notice of Allowance", U.S. Appl. No. 16/583,867, dated Jul. 8, 2020, 8 pages.

Jankovic, et al., "Stepped Bend Substrate Integrated Waveguide to Rectangular Waveguide Transitions", Jun. 2016, 2 pages.

"Extended European Search Report", EP Application No. 22169236.1, dated Sep. 8, 2022, 9 pages.

"Foreign Office Action", CN Application No. 201810122408.4, dated Oct. 18, 2021, 19 pages.

"Non-Final Office Action", U.S. Appl. No. 16/829,409, dated Oct. 14, 2021, 13 pages.

"Non-Final Office Action", U.S. Appl. No. 17/061,675, dated Dec. 20, 2021, 4 pages.

Wang, et al., "Mechanical and Dielectric Strength of Laminated Epoxy Dielectric Graded Materials", Mar. 2020, 15 pages.

* cited by examiner

MULTI-LAYERED AIR WAVEGUIDE ANTENNA WITH LAYER-TO-LAYER CONNECTIONS

CROSS-REFERENCE TO RELATED APPLICATION

This application claims the benefit under 35 U.S.C. 119(e) of U.S. Provisional Application No. 63/183,595, filed May 3, 2021, the disclosure of which is incorporated by reference in its entirety herein.

BACKGROUND

Air waveguides are used in many applications, for example, as antennas to shape or filter, based on frequency, an electromagnetic energy beam. Channels filled with air are some of the internal features of an air waveguide. These channels may include openings, referred to as radiators or slots, that allow the electromagnetic energy to be filtered-in or filtered-out.

Some air waveguides may be formed in layers, for example, layers of a substrate material that are stacked using solder (e.g., tin-bismuth (Sn—Bi) solder) to mechanically bind and electrically couple the layers to keep the layers at a common electrical potential (e.g., grounding the layers to one another). Often these layers are manufactured using injection molded plastics (e.g., filled Polyetherimide (PEI)) and have a metal coating (e.g., silver). Working with metal coated plastics this way to form air waveguides with multiple metal-coated layers can be too expensive for some applications, such as, an automotive context where eventual mass-production is desired.

SUMMARY

This document describes techniques, apparatuses, and systems directed to a multi-layered air waveguide antenna with layer-to-layer connections. Each pre-formed layer of the air waveguide antenna is attached to at least one other pre-formed layer by a mechanical interface. The mechanical interface may be a stud-based interface, a snap fastener-based interface, a ball-and-socket based interface, or a pressure contact interface utilizing irregular roughed surfaces of each pre-formed layer. The mechanical interfaces of the pre-formed layers structurally hold the air waveguide antenna together and electrically couple all of the pre-formed layers. In this manner, the cost of manufacturing the air waveguide antennas may be less expensive than previous manufacturing processes.

Aspects described below include a multi-layered air waveguide antenna with layer-to-layer connections that is configured to guide electromagnetic energy through one or more channels that comprise conducting surfaces. At least one pre-formed layer from the multiple layers of the air waveguide antenna includes at least one interface surface with a mechanical interface configured to provide structural support and a common electrical ground as a layer-to-layer connection between at least two of the multiple layers.

This document also describes methods performed by the above-summarized techniques, apparatuses, and systems, and other methods set forth herein, as well as means for performing these methods.

This Summary introduces simplified concepts related to a multi-layered air waveguide antenna with layer-to-layer connections, further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of a multi-layered air waveguide antenna with layer-to-layer connections are described in this document with reference to the following figures. The same numbers are often used throughout the drawings to reference like features and components:

FIGS. 2-1 through 2-4 illustrate example layer implementations of a multi-layered air waveguide antenna with layer-to-layer connections;

FIGS. 3-1 through 3-3 illustrate three example pre-formed layers of a multi-layered air waveguide antenna with layer-to-layer connections;

FIG. 4 illustrates an example assembly including a multi-layered air waveguide antenna with layer-to-layer connections held together under pressure against a radome;

FIGS. 5-1 and 5-2 illustrate an example interlocking projections mechanical interface of a multi-layered air waveguide with layer-to-layer connections;

FIGS. 6-1 and 6-2 illustrate an example snap fastener mechanical interface of a multi-layered air waveguide with layer-to-layer connections;

FIGS. 7-1 and 7-2 illustrate an example including a ball-and-socket mechanical interface of a multi-layered air waveguide with layer-to-layer connections;

DETAILED DESCRIPTION

Overview

Radar systems are a sensing technology that some automotive systems rely on to acquire information about the surrounding environment. Radar systems generally use an antenna or a waveguide to direct electromagnetic energy or signals being transmitted or received. Such radar systems may use any combination of antennas and waveguides to provide increased gain and directivity. As the automotive industry increasingly utilizes radar systems in more vehicles, the challenge to reduce costs associated with waveguides for these radar systems becomes a higher priority for manufacturers.

This document describes a multi-layered air waveguide antenna with layer-to-layer connections. This air waveguide may be far less expensive to manufacture than existing air waveguide technology. The example air waveguide antenna can be manufactured from stacking multiple pre-formed layers that are held together by a mechanical interface between two adjacent surfaces of two layers. This mechanical interface may be a series of cylindrical protrusions on each of the layers; when the layers are pressed together, the cylindrical protrusions securely connect the layers to one another, like a child's toy blocks. In addition or alternatively, the mechanical interface may be a series of snap fasteners, ball-and-sockets, or areas of roughed surfaces that when compressed are held together by mechanical forces. Additionally, the mechanical interface provides an electrical function; the mechanical interface electrically couples the multiple layers to a common potential, thereby eliminating a need for solder. Because there is no need for solder, there is no risk to causing thermal damage to the metal coated plastics when fitting multiple layers together, resulting in fewer manufacturing steps and lower manufacturing costs. The example air waveguide may therefore be far easier and less expensive to manufacture than existing waveguide technology.

Example Environment

Figure 1:
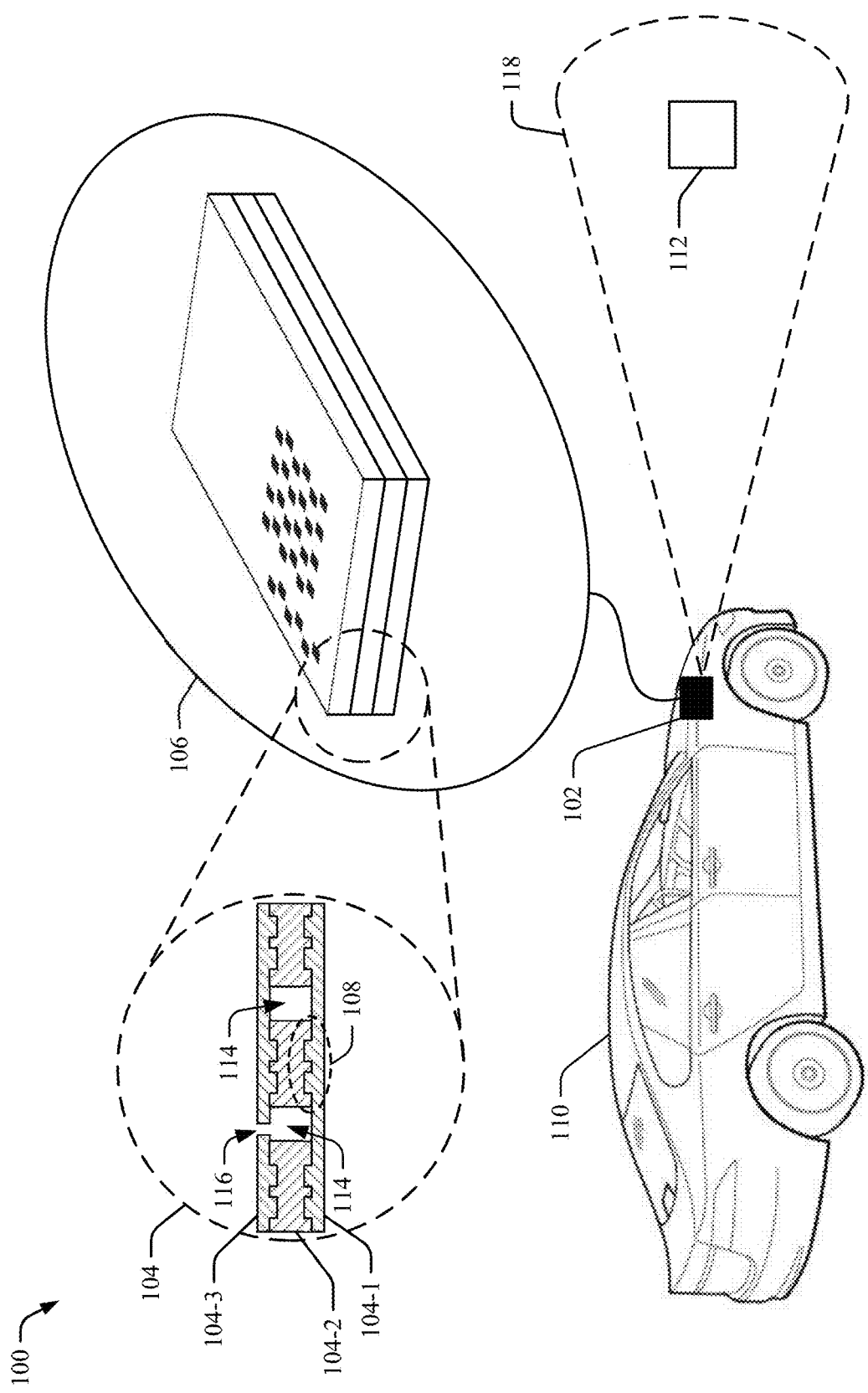
FIG. 1 illustrates an example environment in which a multi-layered air waveguide antenna with layer-to-layer connections may be used on a vehicle.

FIG. 1 illustrates an example environment 100 in which a radar system 102 with a multi-layered 104 air waveguide antenna 106 with layer-to-layer connections 108 is used on a vehicle 110. The vehicle 110 may use one or more air waveguide antennas 106 to enable operations of the radar system 102 that is configured to determine a proximity, an angle, or a velocity of one or more objects 112 in the proximity of the vehicle 110.

At least one or more of the layers may form one or more channels 114, and one or more openings 116 on the air waveguide antenna 106. A layer may form only channels 114 or only openings 116, or the layer may form any combination of channels 114 and openings 116. The openings 116 allow electromagnetic energy to enter (e.g., ports) and exit (e.g., slots) the channels 114. Generally, the channels 114 will have a port opening at one end of the channel 114 and a slot opening at another end of the channel 114. The channels 114 and the openings 116 manipulate the electromagnetic energy in a manner that is advantageous for a particular application of the air waveguide antenna.

Although illustrated as a car, the vehicle 110 can represent other types of motorized vehicles (e.g., a motorcycle, a bus, a tractor, a semi-trailer truck, or construction equipment), non-motorized vehicles (e.g., a bicycle), railed vehicles (e.g., a train or a trolley car), watercraft (e.g., a boat or a ship), aircraft (e.g., an airplane or a helicopter), or spacecraft (e.g., satellite). In general, manufacturers can mount the radar system 102 to any moving platform, including moving machinery or robotic equipment. In other implementations, other devices (e.g., desktop computers, tablets, laptops, televisions, computing watches, smartphones, gaming systems, and so forth) may incorporate the radar system 102 with the air waveguide antenna 106 and support techniques described herein.

In the depicted environment 100, the radar system 102 is mounted near, or integrated within, a front portion of the vehicle 110 to detect the object 112 and avoid collisions. The radar system 102 provides a field-of-view 118 towards the one or more objects 112. The radar system 102 can project the field-of-view 118 from any exterior surface of the vehicle 110. For example, vehicle manufacturers can integrate the radar system 102 into a bumper, side mirror, headlights, rear lights, or any other interior or exterior location where the object 112 requires detection. In some cases, the vehicle 110 includes multiple radar systems 102, such as a first radar system 102 and a second radar system 102 that provide a larger field-of-view 118. In general, vehicle manufacturers can design the locations of the one or more radar systems 102 to provide a particular field-of-view 118 that encompasses a region of interest, including, for instance, in or around a travel lane aligned with a vehicle path.

The radar system 102 can be part of the vehicle 110. The vehicle 110 can also include at least one automotive system that relies on data from the radar system 102, including a driver-assistance system, an autonomous-driving system, or a semi-autonomous-driving system. The radar system 102 can include an interface to the automotive systems. The radar system 102 can output, via the interface, a signal based on electromagnetic energy received by the radar system 102.

Generally, the automotive systems use radar data provided by the radar system 102 to perform a function. For example, the driver-assistance system can provide blind-spot monitoring and generate an alert indicating a potential collision with the object 112 detected by the radar system 102. In this case, the radar data from the radar system 102 indicate when it is safe or unsafe to change lanes. The autonomous-driving system may move the vehicle 110 to a particular location on the road while avoiding collisions with the object 112 detected by the radar system 102. The radar data provided by the radar system 102 can provide information about a distance to and the location of the object 112 to enable the autonomous-driving system to perform emergency braking, perform a lane change, or adjust the speed of the vehicle 110.

The radar system 102 generally includes a transmitter (not illustrated) and at least one antenna, including the air waveguide antenna 106, to transmit electromagnetic signals. The radar system 102 generally includes a receiver (not illustrated) and at least one antenna, including the air waveguide antenna 106, to receive reflected versions of these electromagnetic signals. The transmitter includes components for emitting electromagnetic signals. The receiver includes components to detect the reflected electromagnetic signals. The transmitter and the receiver can be incorporated together on the same integrated circuit (e.g., a transceiver integrated circuit) or separately on different integrated circuits.

The radar system 102 also includes one or more processors (not illustrated) and computer-readable storage media (CRM) (not illustrated). The processor can be a microprocessor or a system-on-chip. The processor executes instructions stored within the CRM. As an example, the processor can control the operation of the transmitter. The processor can also process electromagnetic energy received by the antenna and determine the location of the object 112 relative to the radar system 102. The processor can also generate radar data for the automotive systems. For example, the processor can control, based on processed electromagnetic energy from the antenna, an autonomous or semi-autonomous driving system of the vehicle 110.

Although depicted as three layers (e.g., layers 104-1, 104-2, and 104-3), the air waveguide antenna may include at least two or more layers 104. The layers can be any solid material, including wood, carbon fiber, fiberglass, metal, plastic, or a combination thereof. The air waveguide antenna 106 can also include a printed circuit board (PCB). One common material used for the layers 104 is injection molded plastics (e.g., filled PEI). Each of the layers 104 may be metalized (e.g., coated via plating, physical vapor deposition, painting, or other forms of metallization). The metal used to metalize the layers 104 may be silver, silver alloy, copper, aluminum, cold-rolled steel, stainless steel, or other conductive metal.

The layers 104 are engaged with each other by layer-to-layer connections 108, referred to as a mechanical interface 108, on at least one or more surfaces of each layer 104. The mechanical interface 108 may be a series of cylindrical protrusions on each of the layers, a series of snap fasteners, ball-and-sockets, areas of roughed surfaces compressed to each other, or other forms of the mechanical interface that structurally and electrically connect the layers 104 to one another.

The details of the mechanical interface 108 are described below with respect to FIGS. 2 through 9. Generally, the mechanical interface 108 enables an inexpensive manufacturing process for the air waveguide antenna 106 without the need for solder to physically connect and electrically couple the layers to one another. Using the relatively inexpensive air waveguide antenna 106 for radar applications in vehicles 110 may ultimately contribute to lower prices of the vehicles 110 offered to consumers.

Example Air Waveguide Antenna

Figures 1, 2:
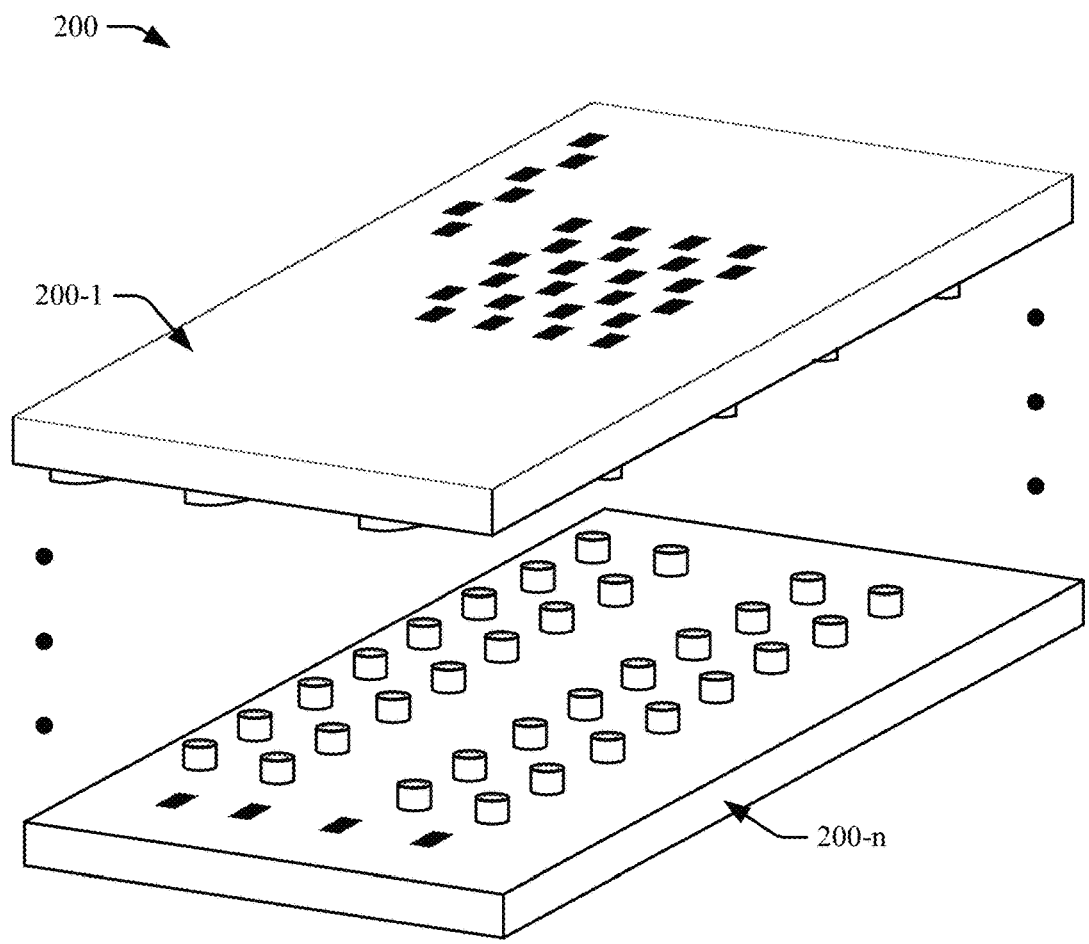
Figure 2:
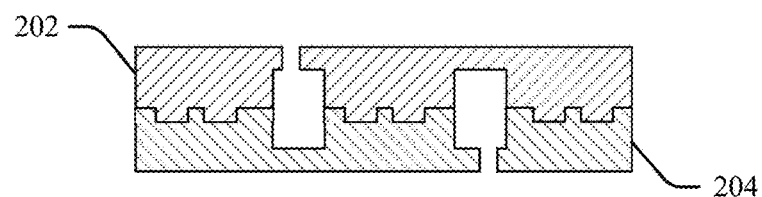

FIGS. 2-1 through 2-4 illustrate example layer implementations of a multi-layered air waveguide antenna 200 with layer-to-layer connections. In FIG. 2-1, layer 200-1 represents a first layer of the air waveguide antenna 200, and layer 200-n represents an nth layer of the air waveguide antenna, where n is an integer greater than one. Each of the layers, 200-1 to 200-n, have at least one interface surface including a mechanical interface, some examples of which are described in FIGS. 5-1 through 8. A first interface surface of a first layer will have a complementary mechanical interface as a second interface surface of a second layer that is adjacent to the first layer. For example, if the mechanical interface being utilized is a ball-and-socket type of interface, then the first interface surface may include the "balls," and the second interface surface may include the sockets. Alternatively, the first and second interface surfaces may include a combination of "balls" and "sockets" as long as each "ball" on one interface surface aligns with a "socket" on the other interface surface. This is the case no matter which interface is used, except in the implementation where the mechanical interface on both interface surfaces is an irregular roughed area. In this implementation, the nature of the irregularity of the roughed surface, along with the layers being compressed together, enables a complementary relation between the two adjacent interface surfaces.

Figures 2, 3:
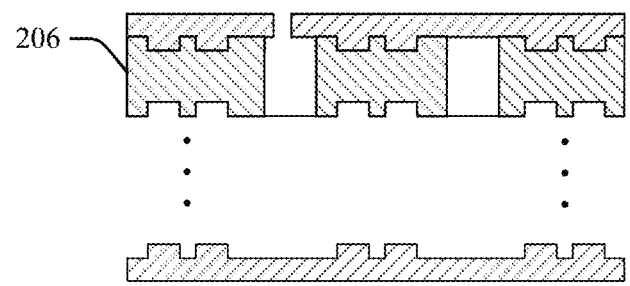
Figures 2, 3, 4:
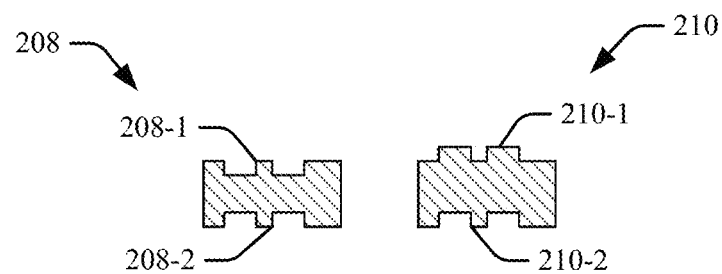
Figures 1, 3:
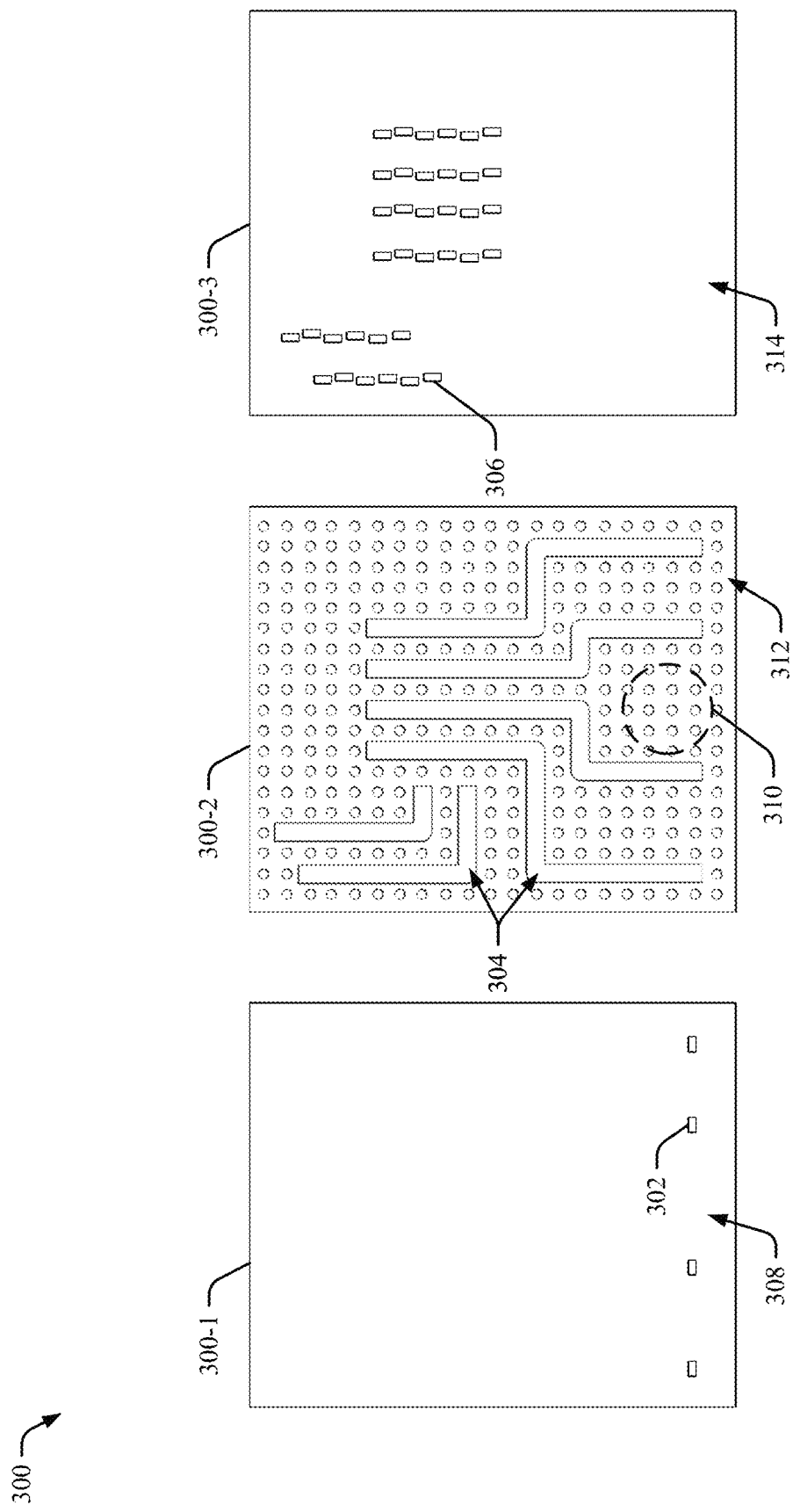
Figures 2, 3:
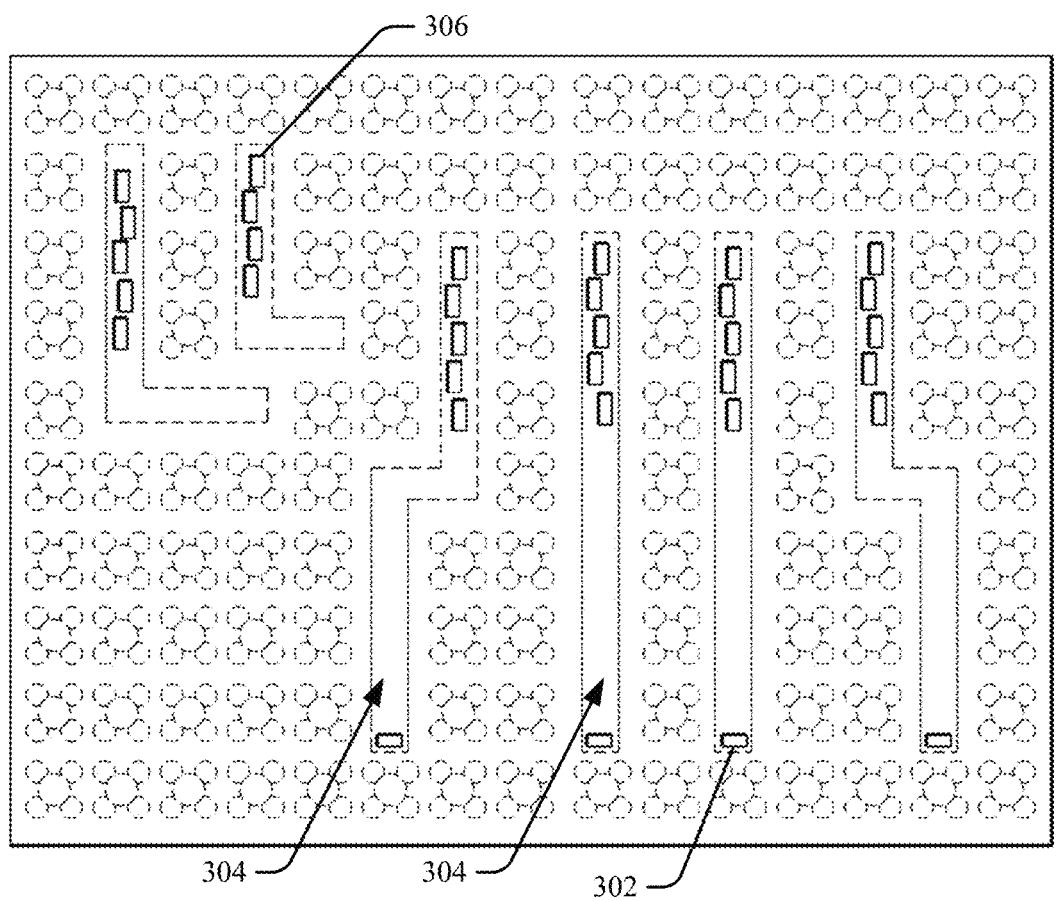
Figure 3:
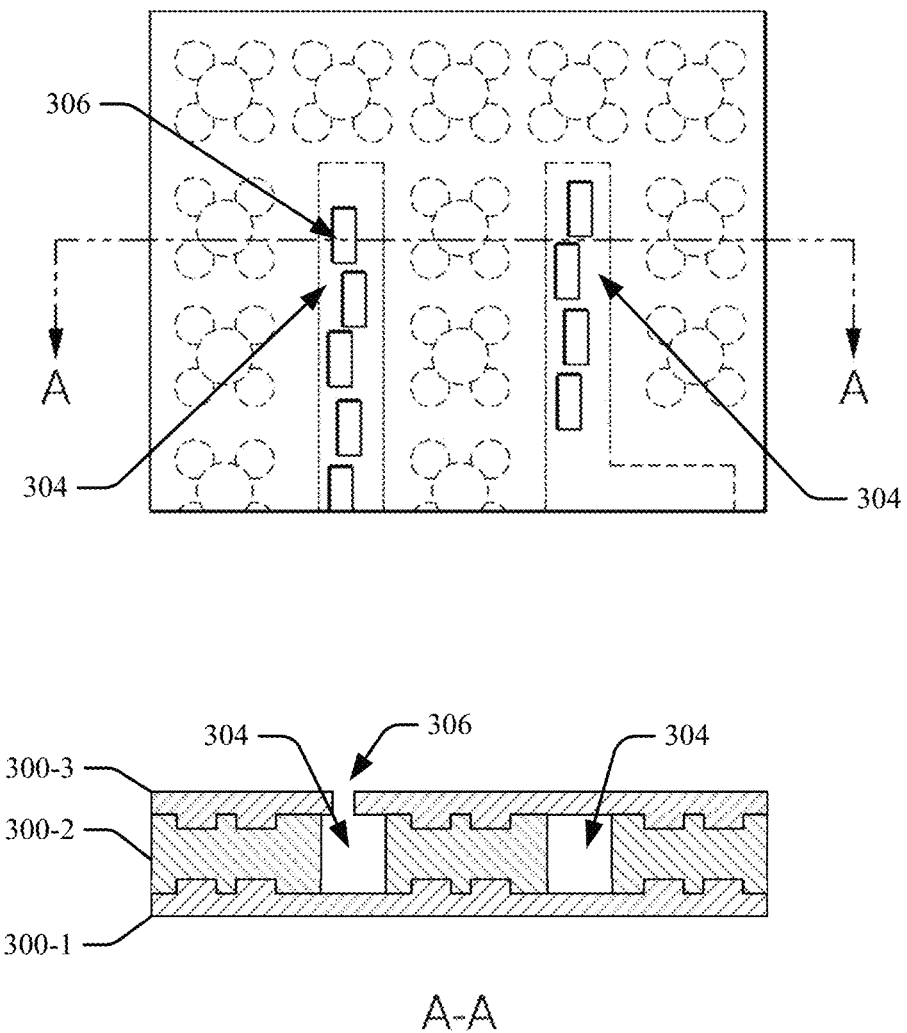
Figure 4:
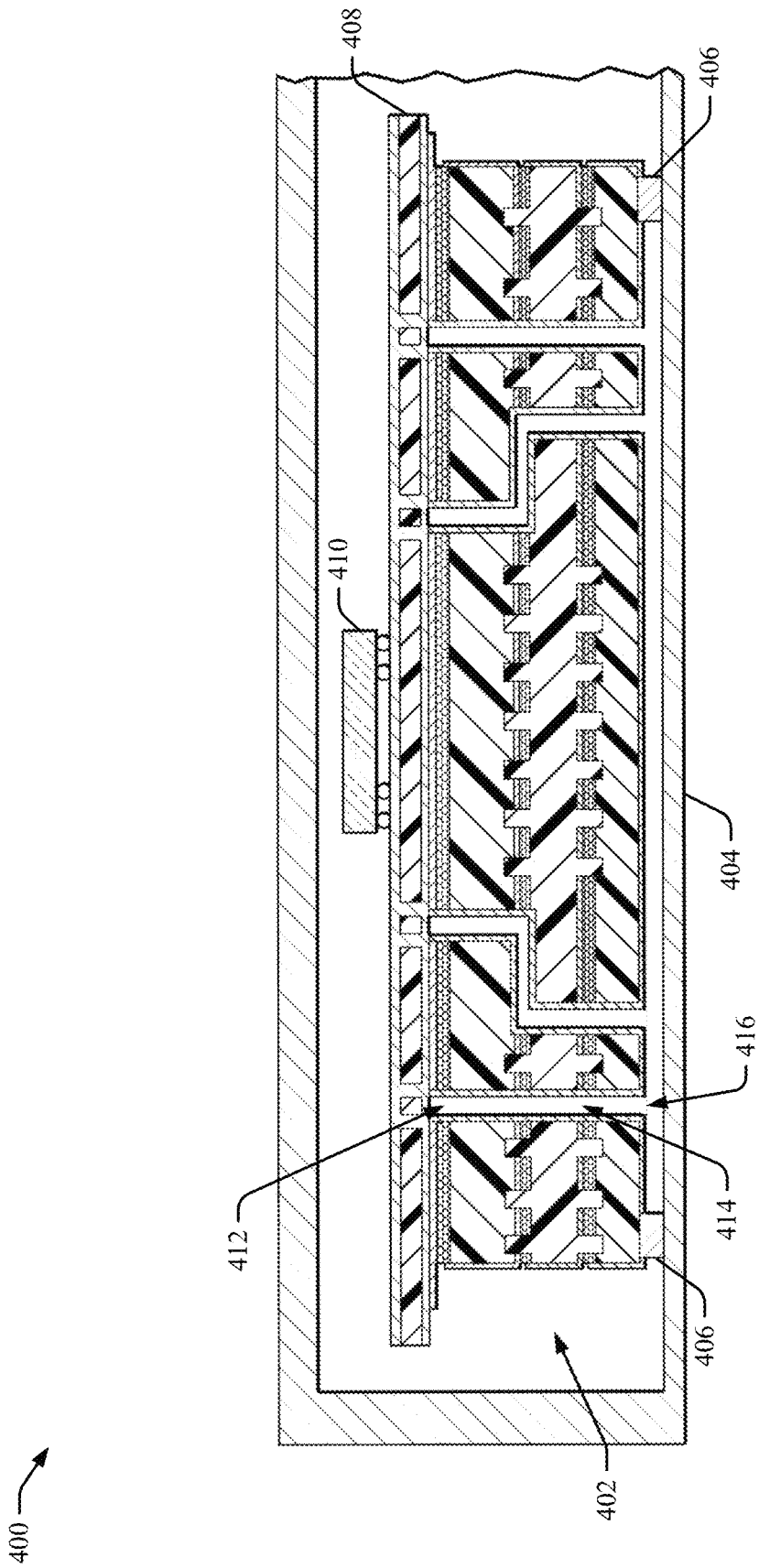

FIG. 2-2 illustrates a two-layered (e.g., a layer 202 and a layer 204) implementation of the air waveguide antenna 200. One or both of the layers 202 and 204 may form channels, openings, or a combination of channels and openings. FIG. 2-3 illustrates a multi-layered implementation of the air waveguide antenna 200. This multi-layered implementation is similar in scope to the implementation in FIG. 2-2, except that one or more internal layers 206, that is, layers that are adjacent to two other layers, may be included. The one or more internal layers 206 may have two interface surfaces, with each interface surface of the one or more internal layers having a mechanical interface. The mechanical interface on an interface surface may be one complementary interface of one type of mechanical interface, a combination of complementary interfaces of one type of mechanical interface, or any combination of the above and including other types of mechanical interfaces. Additionally, as illustrated in FIG. 2-4, both interface surfaces 208-1 and 208-2 of an internal layer 208 may include the same complementary interface shapes, or, as illustrated in an internal layer 210, one interface surface 210-1 may include one mechanical interface, and another interface surface 210-2 may include another mechanical interface. The mechanical interface used on any interface surface of any layer of the air waveguide antenna 200 engages with a complementary mechanical interface of any adjacent interface surface.

FIGS. 3-1 through 3-3 illustrate three example pre-formed layers 300 of a multi-layered air waveguide antenna with layer-to-layer connections and a relation between one or more openings 302 (e.g., ports 302), one or more channels 304, and one or more openings 306 (e.g., slots 306) included in the pre-formed layers. In one non-limiting example, the pre-formed layers 300 are comprised of PEI and pre-formed by an injection molding process. The pre-formed layers 300 are coated with a conductive metal that electrically couples or grounds the pre-formed layers 300 to one another once they are fitted together.

A pre-formed layer 300-1 includes the one or more ports 302. An outer surface 308 of the air waveguide antenna may not include a mechanical interface as described herein. An interface surface of the pre-formed layer 300-1, on the opposing side of the pre-formed layer as the surface 308 and not illustrated, may include a mechanical interface that engages with a mechanical interface 310 on an interface surface 312 of a pre-formed layer 300-2. The pre-formed layer 300-2 includes the one or more channels 304. The pre-formed layer 300-2 further includes a second interface surface, opposing the interface surface 312 and not illustrated, that may include a mechanical interface that engages with an interface surface, not illustrated, of a pre-formed layer 300-3. The pre-formed layer 300-3 includes the one or more slots 306 and an outer surface 314. The outer surface 314 opposes the interface surface, not illustrated, of the pre-formed layer 300-3 and may not include a mechanical interface, similar to the outer surface 308 of pre-formed layer 300-1.

FIG. 3-2 illustrates the relationship between the one or more ports 302 of the pre-formed layer 300-1, the one or more channels 304 of the pre-formed layer 300-2, and the one or more slots 306 of the pre-formed layer 300-3. The one or more ports 302 allow electromagnetic energy to enter the air waveguide antenna, traverse the one or more channels 304, and exit from the one or more slots 306.

FIG. 3-3 illustrates a cross-sectional view of the pre-formed layers 300-1, 300-2, and 300-3, after they have been interlocked to one another. The channels 304 of the pre-formed layer 300-2 feed the slots 306 of the pre-formed layer 300-3. The ports 302 of the pre-formed layer 300-1 are not illustrated but may appear similar to the slots 306 in the cross-sectional view and opening through the pre-formed layer 300-1.

FIG. 4 illustrates an example assembly 400 including a multi-layered air waveguide antenna 402 with layer-to-layer connections held together under pressure against a radome 404. The air waveguide antenna 402 is held together under pressure against the radome 404 by one or more support beams 406. The support beams 406 may extend or partially extend from the radome 404, through the air waveguide antenna 402, to a radar control module PCB (RCM-PCB) 408. The support beams 406 may be bonded to a housing that encloses the air waveguide antenna 402 and the radome 404 by a plastic laser welding process, adhesive, or some other bonding process. The support beams 406 compress the radome, the multiple layers of the air waveguide antenna, and the RCM-PCB 408. This compression may keep the assembly 400 under pressure and may ensure structural integrity and proper grounding throughout the assembly 400.

The RCM-PCB 408 may include a monolithic microwave integrated circuit 410 (MMIC 410). In one example, electromagnetic energy originating from the MMIC 410 enter the air waveguide antenna 402 by one or more ports 412 (similar to the ports 302 from FIG. 3-1), traverse one or more channels 414 (similar to the channels 304 from FIG. 3-1), and exit from one or more slots 416 (similar to the slots 306 from FIG. 3-1).

The assembly 400 that includes the multi-layered air waveguide antenna 402 with layer-to-layer connections held together under pressure against the radome 404 may be an inexpensive option for manufacturers to utilize in radar systems. Solder, generally requiring manufacturing materials with a higher heat rating, is not used to secure multiple layers of the air waveguide antenna 402 together, physically and electrically, and more inexpensive materials (e.g., materials having a lower heat rating) may be used to manufacture the layers.

Example Mechanical Interfaces

Figures 1, 5:
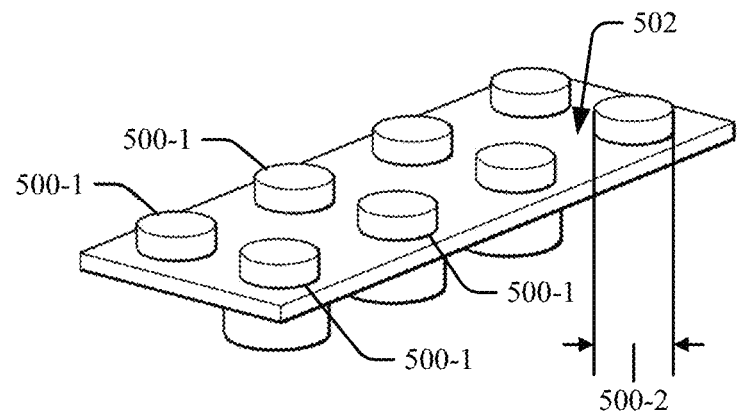
Figures 2, 5:
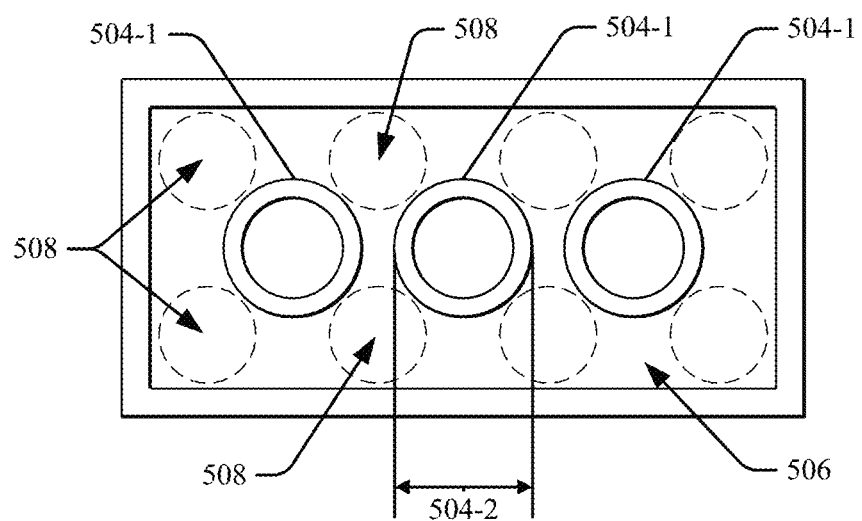

FIGS. 5-1 and 5-2 illustrate an example interlocking projections mechanical interface of a multi-layered air waveguide antenna with layer-to-layer connections. In FIG. 5-1, one or more closed cylindrical projections 500-1, having a circular cross-section 500-2, extend from an interface surface 502. In FIG. 5-2, one or more open cylindrical projections 504-1, having a circular cross-section 504-2, extend from an interface surface 506. The circular cross-sections 500-2 of the closed cylindrical projections 500 are configured to engage the circular cross-sections 504-2 of the open cylindrical projections 504 at multiple locations 508.

Figures 1, 6:
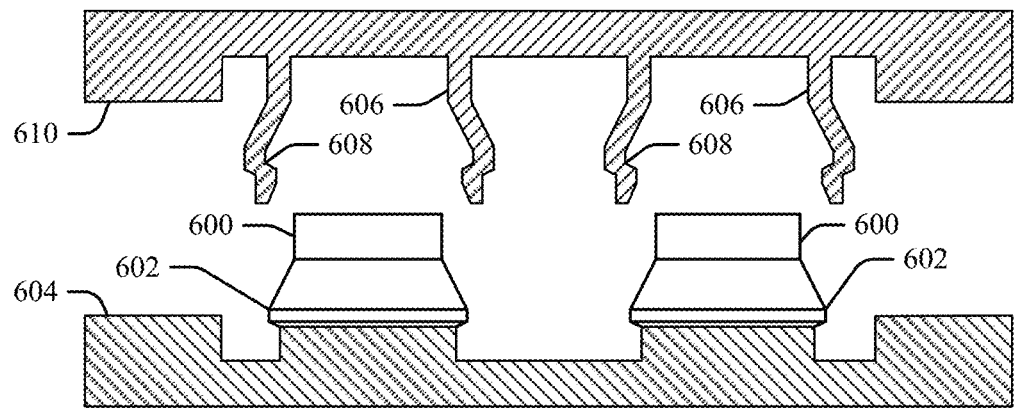
Figures 2, 6:
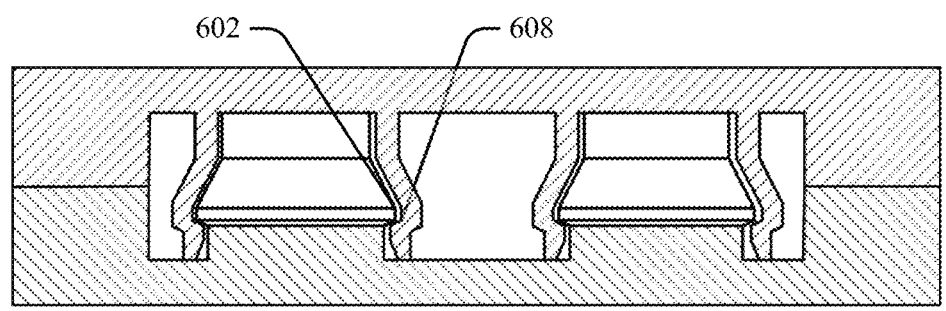

FIGS. 6-1 and 6-2 illustrate an example snap fastener mechanical interface of a multi-layered air waveguide antenna with layer-to-layer connections. In FIG. 6-1, interlockable projections with a closed cylindrical shape 600 have a lip 602 around an exterior wall of the closed cylindrical shape 600 and extend from an interface surface 604. Interlockable projections with an open cylindrical shape 606 have a groove 608 around the interior wall of the open cylindrical shape 606 and extend from an interface surface 610. In FIG. 6-2, the interface surface 604 and the interface surface 610 are pressed together such that the lips 602 of the closed cylindrical shapes 600 engage and rest in the grooves 608 of the open cylindrical shapes 606.

Figures 1, 7:
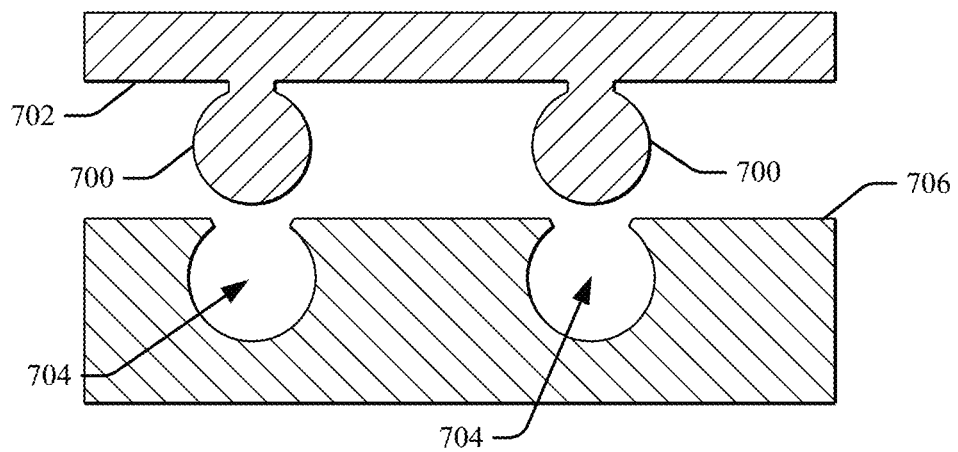
Figures 2, 7:
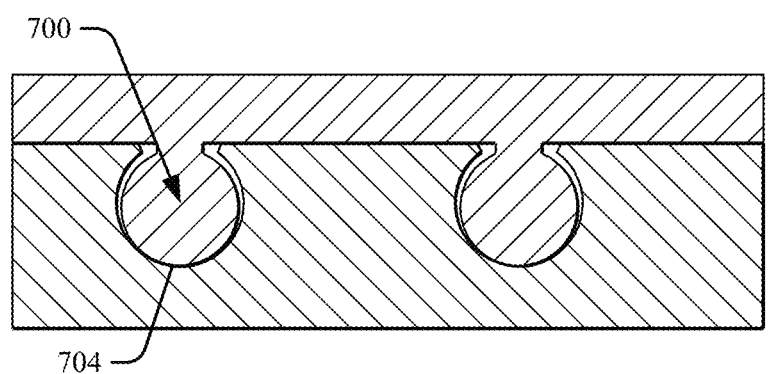

FIGS. 7-1 and 7-2 illustrate an example including a ball-and-socket mechanical interface of a multi-layered air waveguide antenna with layer-to-layer connections. In FIG. 7-1, spherical shapes 700 extend from an interface surface 702, and spherical cavities 704 are in an interface surface 706. As illustrated in FIG. 7-2, the interface surface 702 and the interface surface 706 are pressed together, and the spherical shapes 700 extending from the interface surface 702 may engage the spherical cavities 704 in the interface surface 706.

Figure 8:
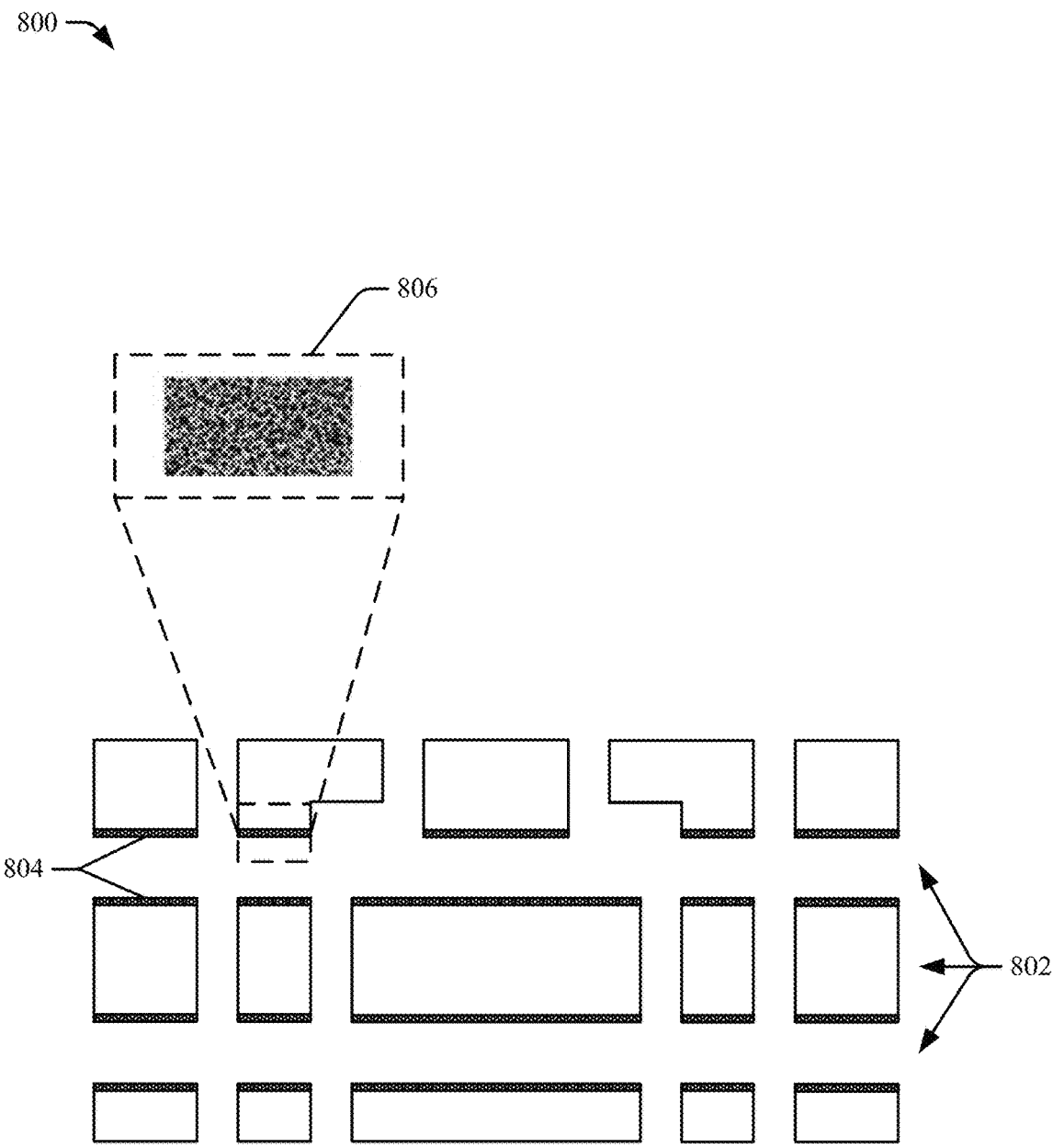
FIG. 8 illustrates an example irregular roughed surface of a mechanical interface of a multi-layered air waveguide with layer-to-layer connections.

FIG. 8 illustrates an example irregular roughed surface mechanical interface of a multi-layered air waveguide antenna 800 with layer-to-layer connections. In FIG. 8, an exploded view of multiple pre-formed layers 802 of the air waveguide antenna 800 reveals irregular roughed surfaces 804 of the pre-formed layers 802 that face other irregular roughed surfaces 804 of adjacent pre-formed layers 802. A magnified view 806 of the irregular roughed surfaces 804 is an example irregular pattern that the roughed surfaces may have. Other irregular patterns may be used as well. Further, the irregular roughed surfaces 804 may be created by a mold, used to form the pre-formed layers 802, by a stamping tool, or by other processes.

The example mechanical interfaces described herein securely fasten two or more pre-formed layers of a multi-layered air waveguide antenna with layer-to-layer connections to one another. Likewise, the example mechanical interfaces electrically couple the pre-formed layers and may provide an inexpensive process for manufacturing the air waveguide antenna.

Example Method

Figure 9:
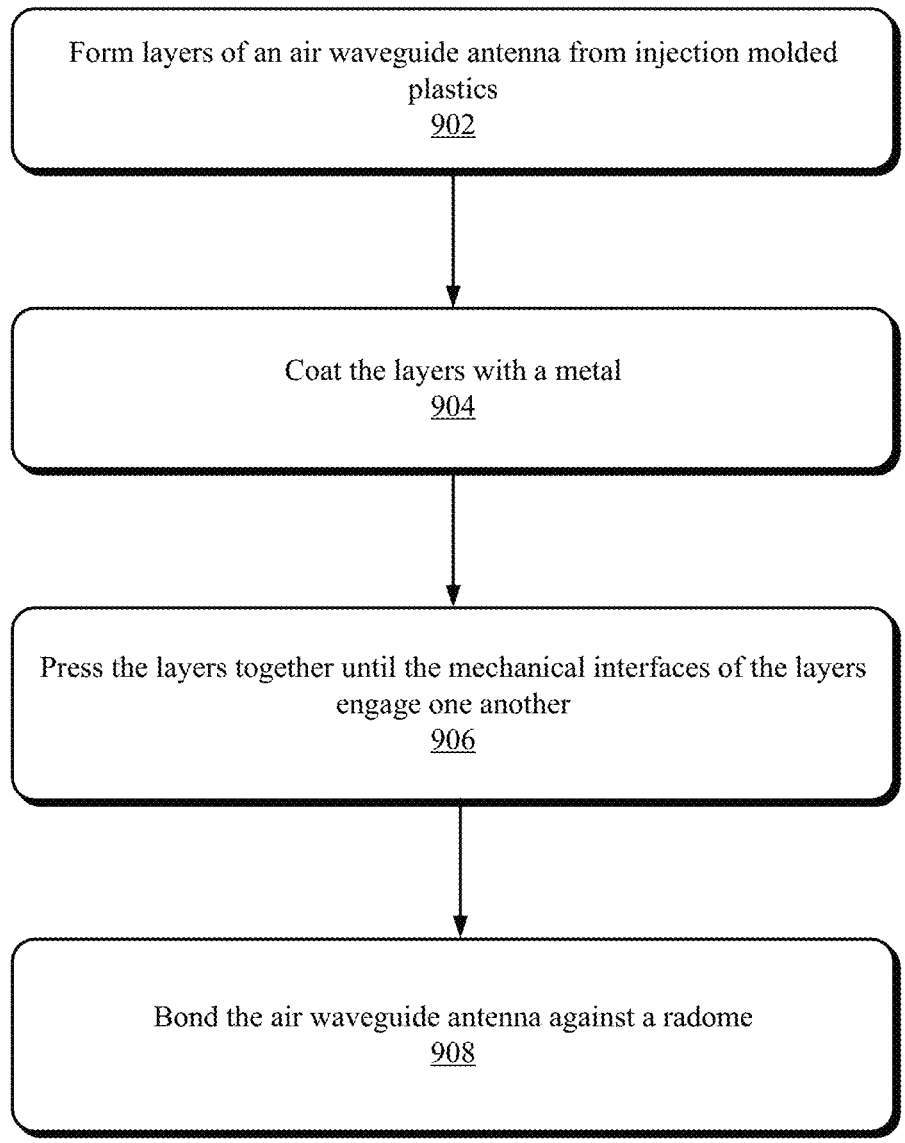
FIG. 9 illustrates an example method of manufacturing a multi-layered air waveguide with layer-to-layer connections.

FIG. 9 illustrates an example method of manufacturing a multi-layered air waveguide with layer-to-layer connections. At 902, layers of an air waveguide antenna are molded out of plastics using an injection molding process. The plastics may have a lower heat rating because they will not be subject to soldering. At 904, the layers are coated with a metal. The coating process may include plating, physical vapor deposition, painting, or another coating process. The metals used to coat the layers may include silver, silver alloy, copper, gold, steel, or other conductive metal. Other conductive materials may, likewise, be used to coat the layers. At 906, the layers are pressed together until the mechanical interface on each interface surface of the layers engages with the mechanical interface on the adjacent layer. At 908, the air waveguide antenna is bonded against a radome. The layers are held together under pressure against the radome by this bonding process.

Eliminating the use of soldering techniques to form metal-coated-plastic air waveguides may greatly simplify a waveguide manufacturing process; there is little risk to causing thermal damage when a mechanical interface can be used instead of solder. This document describes techniques, apparatuses, and systems directed to a multi-layered air waveguide antenna with layer-to-layer connections. Using the techniques, apparatuses, and systems described herein may substantially lower the manufacturing costs associated with radar systems used by the automotive industry.

ADDITIONAL EXAMPLES

Example 1: An apparatus, the apparatus comprising: an air waveguide antenna with layer-to-layer connections between multiple layers, the air waveguide antenna configured to guide an electromagnetic energy through one or more channels that comprise conducting surfaces, at least one pre-formed layer from the multiple layers of the air waveguide includes at least one interface surface with a mechanical interface configured to provide structural support and a common electrical ground as a layer-to-layer connection between at least two of the multiple layers.

Example 2: The apparatus of example 1, wherein the at least one pre-formed layer comprises: a core layer comprised of a plastic material; and an outer layer comprised of a metallic material.

Example 3: The apparatus of example 2, wherein the outer layer comprises at least one of a silver or a silver alloy.

Example 4: The apparatus of example 1, wherein the mechanical interface comprises a series of interlockable projections that extend from the at least one surface of the at least one or more pre-formed layers, the interlockable projections arranged to engage projections from an adjacent pre-formed layer of the multiple layers.

Example 5: The apparatus of example 4, wherein: the interlockable projections that extend from a first surface of a first pre-formed layer comprise a closed cylindrical shape; the interlockable projections that extend from a second surface of a second pre-formed layer comprise an open cylindrical shape having a cylindrical cavity; and a plurality of circular cross-sections of the interlockable projections extend from the first surface of the first pre-formed layer and is configured to engage with at least one or more circular cross-sections of the interlockable projections that extends from the second surface of the second pre-formed layer adjacent to the first pre-formed layer.

Example 6: The apparatus of example 4, wherein: the interlockable projections that extend from a first surface of a first pre-formed layer comprise a closed cylindrical shape having a lip around an exterior wall of the closed cylindrical shape; the interlockable projections that extend from a second surface of a second pre-formed layer comprise an open cylindrical shape having a cylindrical cavity with a groove around an interior wall of the cylindrical cavity; and the lips of the interlockable projections that extend from the first surface of the first pre-formed layer are configured to engage with the grooves of the interlockable projections that extend from the second surface of the second pre-formed layer adjacent to the first pre-formed layer.

Example 7: The apparatus of example 1, wherein: the mechanical interface of a first surface of a first pre-formed layer comprises a series of spherical shapes that extend from the first surface; the mechanical interface of a second surface of a second pre-formed layer comprises a series of spherical cavities in the second surface; and the spherical shapes that extend from the first surface of the first pre-formed layer engage with the spherical cavities in the second surface of the second pre-formed layer adjacent to the first pre-formed layer.

Example 8: The apparatus of example 1, wherein: the mechanical interfaces of a first surface of a first pre-formed layer and a second surface of a second pre-formed layer each comprise an irregular roughed surface finish in areas of both the first surface and the second surface to be bonded; and the irregular roughed surface finish of the first surface of the first pre-formed layer engage with the irregular roughed surface finish of the second surface of the second pre-formed layer adjacent to the first pre-formed layer.

Example 9: The apparatus of example 1, wherein the pre-formed layers are held together under pressure against a radome.

Example 10: A system, the system comprising: a device configured to transmit or receive electromagnetic signals; and an air waveguide antenna with layer-to-layer connections between multiple layers, the air waveguide antenna configured to guide an electromagnetic energy through one or more channels that comprise conducting surfaces, at least one pre-formed layer from the multiple layers of the air waveguide includes at least one interface surface with a mechanical interface configured to provide structural support and a common electrical ground as a layer-to-layer connection between at least two of the multiple layers.

Example 11: The system of example 10, wherein the at least one pre-formed layer comprises: a core layer comprised of a plastic material; and an outer layer comprised of a metallic material.

Example 12: The system of example 11, wherein the outer layer comprises at least one of a silver or a silver alloy.

Example 13: The system of example 10, wherein the mechanical interface comprises a series of interlockable projections that extend from the at least one surface of the at least one or more pre-formed layers, the interlockable projections arranged to engage projections from an adjacent pre-formed layer of the multiple layers.

Example 14: The system of example 13, wherein: the interlockable projections that extend from a first surface of a first pre-formed layer comprise a closed cylindrical shape; the interlockable projections that extend from a second surface of a second pre-formed layer comprise an open cylindrical shape having a cylindrical cavity; and a plurality of circular cross-sections of the interlockable projections extend from the first surface of the first pre-formed layer and is configured to engage with at least one or more circular cross-sections of the interlockable projections that extends from the second surface of the second pre-formed layer adjacent to the first pre-formed layer.

Example 15: The system of example 13, wherein: the interlockable projections that extend from a first surface of a first pre-formed layer comprise a closed cylindrical shape having a lip around an exterior wall of the closed cylindrical shape; the interlockable projections that extend from a second surface of a second pre-formed layer comprise an open cylindrical shape having a cylindrical cavity with a groove around an interior wall of the cylindrical cavity; and the lips of the interlockable projections that extend from the first surface of the first pre-formed layer are configured to engage with the grooves of the interlockable projections that extend from the second surface of the second pre-formed layer adjacent to the first pre-formed layer.

Example 16: The system of example 10, wherein: the mechanical interface of a first surface of a first pre-formed layer comprises a series of spherical shapes that extend from the first surface; the mechanical interface of a second surface of a second pre-formed layer comprises a series of spherical cavities in the second surface; and the spherical shapes that extend from the first surface of the first pre-formed layer engage with the spherical cavities in the second surface of the second pre-formed layer adjacent to the first pre-formed layer.

Example 17: The system of example 10, wherein: the mechanical interfaces of a first surface of a first pre-formed layer and a second surface of a second pre-formed layer each comprise an irregular roughed surface finish in areas of both the first surface and the second surface to be bonded; and the irregular roughed surface finish of the first surface of the first pre-formed layer engage with the irregular roughed surface finish of the second surface of the second pre-formed layer adjacent to the first pre-formed layer.

Example 18: The system of example 10, wherein the pre-formed layers are held together under pressure against a radome.

Example 19: The system of example 10, wherein the device comprises a radar system.

Example 20: The system of example 19, wherein the system is a vehicle.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

What is claimed is:
1. An apparatus, comprising:
an air waveguide antenna with layer-to-layer connections between multiple layers, the air waveguide antenna configured to guide an electromagnetic energy through one or more channels that comprise conducting surfaces, wherein
at least one pre-formed layer from the multiple layers of the air waveguide antenna includes at least one interface surface with a mechanical interface configured to provide structural support and a common electrical ground as a layer-to-layer connection between at least two of the multiple layers, and
the multiple layers are held together under pressure against a radome.

2. The apparatus of claim 1, wherein the mechanical interface comprises a series of interlockable projections that extend from the at least one interface surface of the at least one pre-formed layer, the interlockable projections arranged to engage projections from an adjacent pre-formed layer of the multiple layers.

3. The apparatus of claim 2, wherein:
the interlockable projections that extend from a first surface of a first pre-formed layer comprise a closed cylindrical shape;
the interlockable projections that extend from a second surface of a second pre-formed layer comprise an open cylindrical shape having a cylindrical cavity; and
a plurality of circular cross-sections of the interlockable projections extend from the first surface of the first pre-formed layer and is configured to engage with at least one or more circular cross-sections of the interlockable projections that extends from the second surface of the second pre-formed layer adjacent to the first pre-formed layer.

4. The apparatus of claim 2, wherein:
the interlockable projections that extend from a first surface of a first pre-formed layer comprise a closed cylindrical shape having a lip around an exterior wall of the closed cylindrical shape;
the interlockable projections that extend from a second surface of a second pre-formed layer comprise an open cylindrical shape having a cylindrical cavity with a groove around an interior wall of the cylindrical cavity; and
the lips of the interlockable projections that extend from the first surface of the first pre-formed layer are configured to engage with the grooves of the interlockable projections that extend from the second surface of the second pre-formed layer adjacent to the first pre-formed layer.

5. The apparatus of claim 1, wherein:
the mechanical interface of a first surface of a first pre-formed layer comprises a series of spherical shapes that extend from the first surface;
the mechanical interface of a second surface of a second pre-formed layer comprises a series of spherical cavities in the second surface; and
the series of spherical shapes that extend from the first surface of the first pre-formed layer engage with the spherical cavities in the second surface of the second pre-formed layer adjacent to the first pre-formed layer.

6. The apparatus of claim 1, wherein:
the mechanical interface of a first surface of a first pre-formed layer and the mechanical interface of a second surface of a second pre-formed layer each comprise an irregular roughed surface finish in areas of both the first surface and the second surface to be bonded; and
the irregular roughed surface finish of the first surface of the first pre-formed layer engage with the irregular roughed surface finish of the second surface of the second pre-formed layer adjacent to the first pre-formed layer.

7. The apparatus of claim 1, wherein the multiple layers are held together under pressure against the radome by one or more support beams.

8. An apparatus, comprising:
an air waveguide antenna with layer-to-layer connections between multiple layers, the air waveguide antenna configured to guide an electromagnetic energy through one or more channels that comprise conducting surfaces, wherein
at least one pre-formed layer from the multiple layers of the air waveguide antenna includes at least one interface surface with a mechanical interface configured to provide structural support and a common electrical ground as a layer-to-layer connection between at least two of the multiple layers, and
the at least one pre-formed layer includes a core layer comprised of a plastic material; and an outer layer comprised of a metallic material.

9. The apparatus of claim 8, wherein the outer layer comprises at least one of a silver or a silver alloy.

10. A system, comprising:
a device configured to transmit or receive electromagnetic signals; and
an air waveguide antenna with layer-to-layer connections between multiple layers, the air waveguide antenna configured to guide an electromagnetic energy through one or more channels that comprise conducting surfaces, wherein
at least one pre-formed layer from the multiple layers of the air waveguide antenna includes at least one interface surface with a mechanical interface configured to provide structural support and a common electrical ground as a layer-to-layer connection between at least two of the multiple layers, and
the multiple layers are held together under pressure against a radome.

11. The system of claim 10, wherein the at least one pre-formed layer comprises:
a core layer comprised of a plastic material; and
an outer layer comprised of a metallic material.

12. The system of claim 11, wherein the outer layer comprises at least one of a silver or a silver alloy.

13. The system of claim 10, wherein the mechanical interface comprises a series of interlockable projections that extend from the at least one interface surface of the at least one pre-formed layer, the interlockable projections arranged to engage projections from an adjacent pre-formed layer of the multiple layers.

14. The system of claim 13, wherein:
the interlockable projections that extend from a first surface of a first pre-formed layer comprise a closed cylindrical shape;
the interlockable projections that extend from a second surface of a second pre-formed layer comprise an open cylindrical shape having a cylindrical cavity; and
a plurality of circular cross-sections of the interlockable projections extend from the first surface of the first pre-formed layer and is configured to engage with at least one or more circular cross-sections of the interlockable projections that extends from the second surface of the second pre-formed layer adjacent to the first pre-formed layer.

15. The system of claim 13, wherein:
the interlockable projections that extend from a first surface of a first pre-formed layer comprise a closed cylindrical shape having a lip around an exterior wall of the closed cylindrical shape;
the interlockable projections that extend from a second surface of a second pre-formed layer comprise an open cylindrical shape having a cylindrical cavity with a groove around an interior wall of the cylindrical cavity; and the lips of the interlockable projections that extend from the first surface of the first pre-formed layer are configured to engage with the grooves of the interlockable projections that extend from the second surface of the second pre-formed layer adjacent to the first pre-formed layer.

16. The system of claim 10, wherein:

the mechanical interface of a first surface of a first pre-formed layer comprises a series of spherical shapes that extend from the first surface;

the mechanical interface of a second surface of a second pre-formed layer comprises a series of spherical cavities in the second surface; and the series of spherical shapes that extend from the first surface of the first pre-formed layer engage with the spherical cavities in the second surface of the second pre-formed layer adjacent to the first pre-formed layer.

17. The system of claim 10, wherein:

the mechanical interface of a first surface of a first pre-formed layer and the mechanical interface of a second surface of a second pre-formed layer each comprise an irregular roughed surface finish in areas of both the first surface and the second surface to be bonded; and the irregular roughed surface finish of the first surface of the first pre-formed layer engage with the irregular roughed surface finish of the second surface of the second pre-formed layer adjacent to the first pre-formed layer.

18. The system of claim 10, wherein the device comprises a radar system.

19. The system of claim 18, wherein the system is a vehicle.

20. The system of claim 10, wherein the multiple layers are held together under pressure against the radome by one or more support beams.

* * * * *